(12) United States Patent
Somasundaram et al.

(10) Patent No.: US 10,218,913 B2
(45) Date of Patent: Feb. 26, 2019

(54) HDR/WDR IMAGE TIME STAMPS FOR SENSOR FUSION

(71) Applicant: QUALCOMM Incorporated, San Diego, CA (US)

(72) Inventors: Kiran Somasundaram, San Diego, CA (US); Mainak Biswas, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/490,621

(22) Filed: Apr. 18, 2017

(65) Prior Publication Data

US 2018/0302543 A1    Oct. 18, 2018

(51) Int. Cl.
*H04N 5/232*  (2006.01)
*H04N 5/265*  (2006.01)
*G06F 17/30*  (2006.01)
*H04N 5/235*  (2006.01)

(52) U.S. Cl.
CPC .......... *H04N 5/2352* (2013.01); *H04N 5/265* (2013.01); *G06F 17/30044* (2013.01)

(58) Field of Classification Search
CPC ..... H04N 5/2352; H04N 5/265; H04N 5/2353
See application file for complete search history.

(56) References Cited

U.S. PATENT DOCUMENTS

| 2001/0040632 | A1  | 11/2001 | Yang et al. |
| 2002/0140842 | A1  | 10/2002 | Olding et al. |
| 2003/0223532 | A1  | 12/2003 | Clinthorne et al. |
| 2007/0103569 | A1  | 5/2007  | Kawahito |
| 2010/0271512 | A1  | 10/2010 | Garten |
| 2013/0070121 | A1  | 3/2013  | Gu et al. |
| 2016/0261807 | A1* | 9/2016  | Seshadrinathan .... H04N 5/2258 |

* cited by examiner

*Primary Examiner* — Ahmed A Berhan
(74) *Attorney, Agent, or Firm* — Paradice & Li LLP

(57) ABSTRACT

Provided are systems and methods for determining timestamp information for High Dynamic Range and/or Wide Dynamic Range composite images. For example, an apparatus is provided that comprises an image sensor configured to capture a plurality of sub-frames of a scene, wherein each sub-frame comprises an image of the scene captured using an exposure time that is different from at least one other exposure time of at least one other sub-frame of the plurality of sub-frames. The apparatus is configured to receive, for each of the plurality of sub-frames, sub-pixel image data corresponding to a first portion of an image frame, determine composite image data corresponding to the first portion of the image frame based on values of the received sub-pixel image data for the plurality of sub-frames, identify an indicator based on the sub-frames corresponding to the received sub-pixel image data, and determine timestamp information, based on the identified indicator.

18 Claims, 7 Drawing Sheets

_US 10,218,913 B2_

HDR/WDR IMAGE TIME STAMPS FOR SENSOR FUSION

FIELD

This disclosure generally relates to image processing, and more particularly to High Dynamic Range (HDR) and/or Wide Dynamic Range (WDR) image processing.

BACKGROUND

HDR/WDR imaging is a technique used in imaging and photography to reproduce a greater dynamic range of luminosity than would be otherwise possible with standard imaging techniques. This is because standard imaging sensors often are only able to capture a narrow range of pixel intensities. When capturing images with uneven lighting (e.g., scenes containing direct sunlight and dark shadows), existing image sensors are unable to capture the entire spectrum of luminosity, resulting in loss of detail in highlights or shadow.

HDR/WDR techniques may involve capturing multiple images using different exposure times, in order to produce a set of images having different luminosity ranges. The images may then be combined in order to produce a single image having a greater luminosity range than. However, scenes containing moving objects may present difficulties. Due to the objects appearing in different locations in each of the captured images due to the different amounts of exposure, the combining of the captured images may often result in ghosting or blurring. Mitigating ghosting and blurring is often a computationally expensive process, and are difficult to implement in applications requiring high throughput and/or single path functionality, such as video capture.

SUMMARY

The systems, methods and devices of this disclosure each have several innovative aspects, no single one of which is solely responsible for the desirable attributes disclosed herein.

One aspect of the present application provides an apparatus to determine timestamp information. The apparatus comprises an image sensor configured to capture a plurality of sub-frames of a scene. Each sub-frame may comprise an image of the scene captured using an exposure time that is different from at least one other exposure time of at least one other sub-frame of the plurality of sub-frames. The apparatus further comprises at least one processor coupled to the image sensor and configured to receive, from the image sensor, for each of the plurality of sub-frames, sub-pixel image data corresponding to a first portion of an image frame. The processor is further configured to determine composite image data corresponding to the first portion of the image frame, based on values of the received sub-pixel image data for the plurality of sub-frames. The processor is further configured to identify an indicator based on the sub-frames corresponding to the received sub-pixel image data used to determine the composite image data. The processor is further configured to determine timestamp information, based on the identified indicator, wherein the timestamp information corresponds to the composite image data based upon timing information for the plurality of sub-frames.

Another aspect of the present application provides a method for determining timestamp information for wide dynamic range composite images. The method comprises receiving, from an image sensor, sub-pixel image data corresponding to a first portion of an image frame for each of a plurality of sub-frames, each sub-frame comprising an image of a scene captured using an exposure time that is different from at least one other exposure time of at least one other sub-frame of the plurality of sub-frames. The method further comprises determining composite image data corresponding to the first portion of the image frame, based on values of the received sub-pixel image data for the plurality of sub-frames. The method further comprises identifying an indicator based on the sub-frames corresponding to the received sub-pixel image data used to determine the composite image data. The method further comprises determining timestamp information, based on the identified indicator, wherein the timestamp information corresponds to the composite image data based upon timing information for the plurality of sub-frames.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Further, the systems and methods described herein may be implemented on a variety of different computing devices that host a camera. These include mobile phones, tablets, dedicated cameras, portable computers, photo booths or kiosks, personal digital assistants, ultra-mobile personal computers, mobile internet devices, security cameras, action cameras, drone cameras, automotive cameras, body cameras, head mounted cameras, etc. They may use general purpose or special purpose computing system environments or configurations. Examples of computing systems, environments, and/or configurations that may be suitable for use with the described technology include, but are not limited to, personal computers (PCs), server computers, hand-held or laptop devices, multiprocessor systems, microprocessor-based systems, programmable consumer electronics, network PCs, minicomputers, mainframe computers, distributed computing environments that include any of the above systems or devices, and the like.

Composite images such as WDR images or HDR images may be used when capturing images of scenes having a wide range of illumination. For example, automotive cameras may be expected to be able to capture images having an extreme dynamic range of illumination, wherein portions of a scene may be significantly bright (e.g., the sun, oncoming headlights, and/or the like), while other portions of the scene may be poorly illuminated (e.g., nighttime, within a tunnel, under a bridge, and/or the like).

Figure 1:
FIG. 1 illustrates example scenes that may be captured using WDR imaging.
Figure 1:
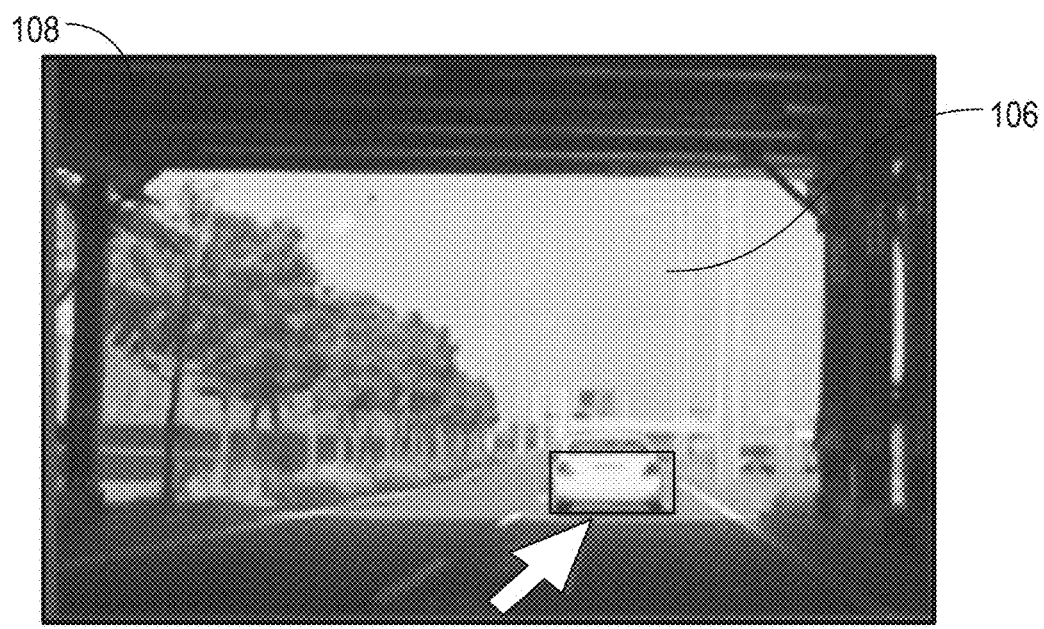

FIG. 1 illustrates example scenes that may be captured using composite imaging. Both scene 102 and scene 104 contain areas of brightness 106 (e.g., car headlights, clear sky) and areas of poor illumination 108 (e.g., shadows in an indoor parking lot, under a bridge). As such, the range of luminosities of the image may be greater than what can be captured by a conventional camera, which can result in saturation (e.g., in bright areas 106) and/or graininess (e.g., in dark areas 108). By combining multiple captured images of different exposure times, composite imaging may be used in order to capture images of the scenes 102 and 104 such that both light areas 106 and dark areas 108 are can be clearly captured.

Figure 2:
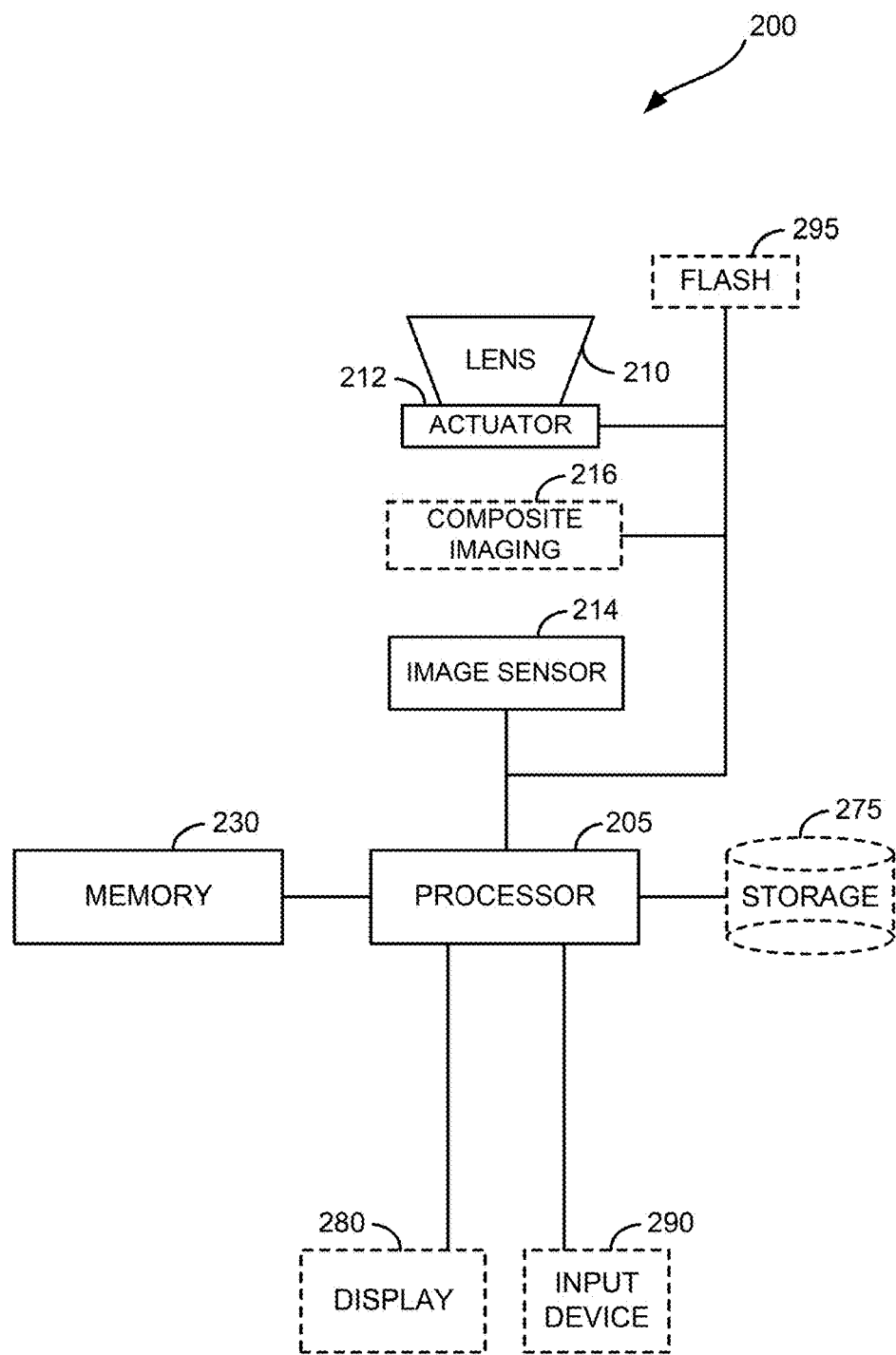
FIG. 2 depicts a block diagram illustrating an example of an imaging device in accordance with aspects of this disclosure.

FIG. 2 depicts a block diagram illustrating an example of an imaging device in accordance with aspects of this disclosure. The imaging device 200, also referred herein to interchangeably as a camera, may include a processor 205 operatively connected to an image sensor 214, a composite imaging integrated circuit (IC) 216, a lens 210, an actuator 212, a memory 230, an optional storage 275, an optional display 280, an optional input device 290, and an optional flash 295. In this example, the illustrated memory 230 may store instructions to configure processor 205 to perform functions relating to the imaging device 200, such as performing composite image processing.

In an illustrative embodiment, light enters the lens 210 and is focused on the image sensor 214. In some embodiments, the lens 210 is part of a system which can include multiple lenses and adjustable optical elements and may be controllable by the processor 205. In one aspect, the image sensor 214 utilizes a charge coupled device (CCD). In another aspect, the image sensor 214 utilizes either a complementary metal-oxide semiconductor (CMOS) or CCD sensor. The lens 210 is coupled to the actuator 212 and may be moved by the actuator 212 relative to the image sensor 214. The movement of the lens 210 with respect to the image sensor 214 may be used to focus captured image. For example, the actuator 212 may be configured to move the lens 210 in a series of one or more lens movements to adjust the lens position to change the focus of an image. In some embodiments, the processor 205 may comprise an image signal processor (ISP). In some embodiments, the processor 205 may comprise a sensor fusion processor which may be used to analyzed captured image data in conjunction with data captured from one or more other types of sensors (not shown). In some embodiments, sensor fusion may be performed using a separate sensor fusion processor (not shown) that is different from processor 205.

The display 280 may be configured to display images captured via the lens 210 and the image sensor 214 and may also be utilized to implement configuration functions of the imaging device 200. In one implementation, the display 280 may be configured to display one or more regions of a captured image selected by a user, via an input device 290, of the imaging device 200. In some embodiments, the imaging device 200 may not include the display 280.

The input device 290 may take on many forms depending on the implementation. In some implementations, the input device 290 may be integrated with the display 280 so as to form a touch screen display. In other implementations, the input device 290 may include separate keys or buttons on the imaging device 200. These keys or buttons may provide input for navigation of a menu that is displayed on the display 280. In other implementations, the input device 290 may be an input port. For example, the input device 290 may provide for operative coupling of another device to the imaging device 200. The imaging device 200 may then receive input from an attached keyboard or mouse via the input device 290. In still other embodiments, the input device 290 may be remote from and communicate with the imaging device 200 over a communication network, e.g., a wireless network.

In some embodiments, the composite imaging IC 216 may be used to perform composite imaging on one or more captured images (e.g., captured by image sensor 214). Composite imaging may correspond to WDR imaging, HDR imaging, or other types of imaging that generate a single composite images from multiple captured images of a scene. For example, the composite imaging IC 216 may receive image data from multiple frames corresponding to the same scene but taken with different exposure levels. The image data from the different frames may be analyzed to determine how a composite image should be constructed using the pixels of the different frames. In addition, the composite imaging IC 216 may be further configured to recording timestamp information associated with the captured image frames and constructed composite images. The structure and operation of composite imaging IC 216 will be described in greater detail below in association with FIGS. 3-7. In some embodiments, one or more composite imaging functions may be performed by processor 205 (e.g., by an ISP) instead of by composite imaging IC 216, or by a combination of composite imaging IC 216 and processor 205. For example, the processor 205 may comprise an ISP capable of performing composite functions.

The memory 230 may be utilized by the processor 205 to store data dynamically created during operation of the imaging device 200. In some instances, the memory 230 may include a separate working memory in which to store the dynamically created data. For example, instructions stored in the memory 230 may be stored in the working memory when executed by the processor 205. The working memory may also store dynamic run time data, such as stack or heap data utilized by programs executing on processor 205. The storage 275 may be utilized to store data created by the imaging device 200. For example, images captured via image sensor 214 may be stored on storage 275. Like the input device 290, the storage 275 may also be located remotely, i.e., not integral with the imaging device 200, and may receive captured images via the communication network.

The memory 230 may be considered a computer readable medium and stores instructions for instructing the processor 205 and/or composite imaging IC 216 to perform various functions in accordance with this disclosure. For example, in some aspects, memory 230 may be configured to store instructions that cause the processor 205 and/or composite imaging IC 216 to perform various methods, such as those as described below and as illustrated in FIGS. 3-7.

WDR with Rolling Shutter

In some embodiments, multiple image frames having different exposure times (hereinafter referred to as sub-frames) may be captured in order to construct a composite image frame, such as an HDR or WDR image frame. For example, in some embodiments, the multiple sub-frames may comprise a first sub-frame having a long exposure time T1, a second sub-frame having a medium exposure time T2, and a third sub-frame having a short exposure time T3. Although the present application may refer primarily to composite images constructed based upon three different sub-frame having exposure times T1, T2, and T3, it is understood that in other embodiments, WDR images may be constructed using any number of different sub-frame with different combinations of exposure times.

A composite image may be constructed by combining the multiple sub-frames associated with different exposure times. For example, different parts of the composite image can be obtained from different combinations of the different sub-frames. In some embodiments, the luminosities of the pixels of each sub-frame (hereinafter also referred to as sub-pixels) may be analyzed, such that portions of the composite image corresponding to areas of the scene that are only lightly illuminated (e.g., dark areas 108) are constructed using sub-frames having longer exposure times, while portions of the composite image corresponding to areas of the scene that are brightly illuminated (e.g., light areas 106) are constructed using sub-frames having shorter exposure times. In addition, in some embodiments, portions of the composite image corresponding to areas of the scene where motion is detected may be constructed from sub-pixels of sub-frames having shorter exposure times in order to reduce an amount of ghosting or blur associated with the motion. In some embodiments, each pixel of the composite image may correspond to a sub-pixel of a single sub-frame. In other embodiments, pixels of the composite image may comprise a blending of sub-pixel values from more than one sub-frame.

Figure 3:
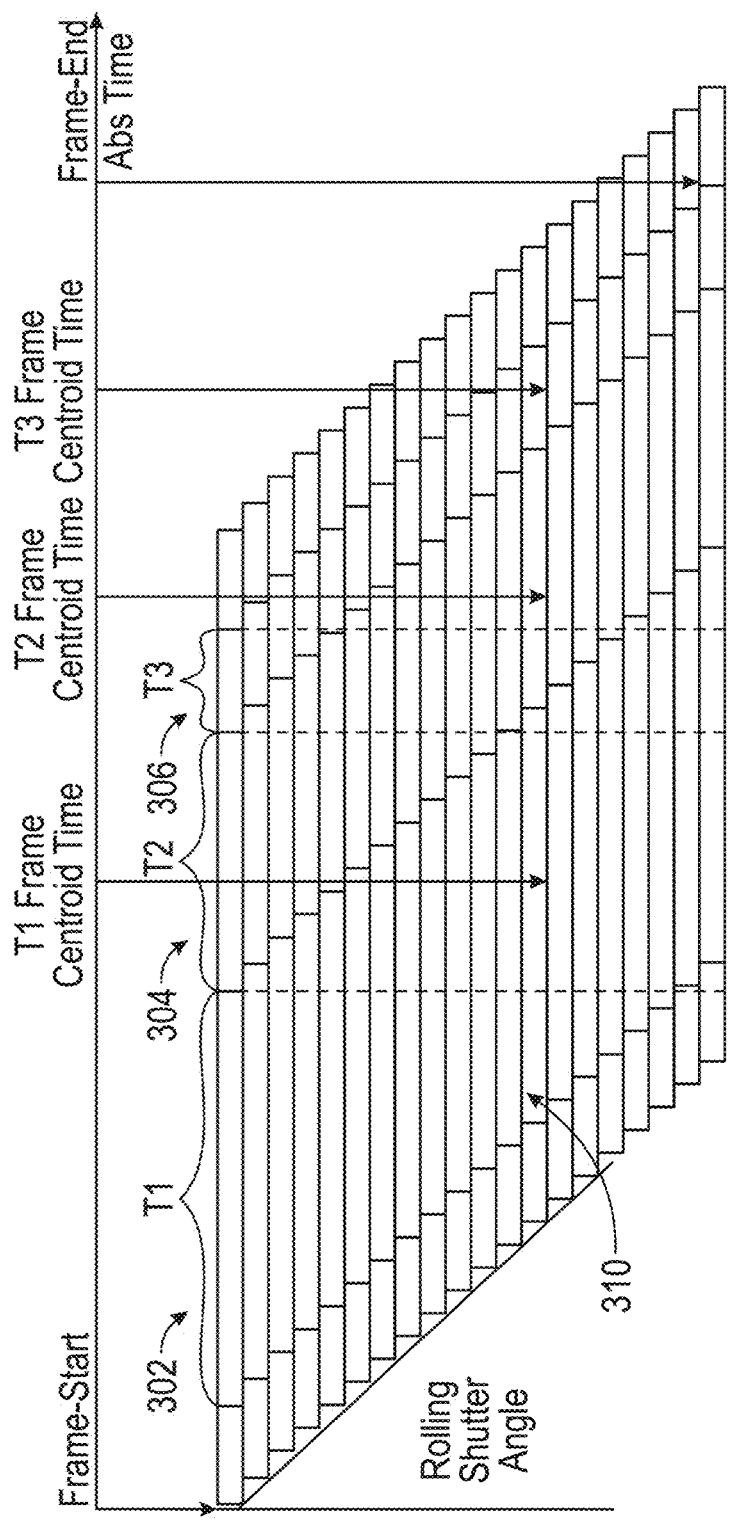
FIG. 3 illustrates an example diagram of capturing a WDR image using different sub-frames.

FIG. 3 illustrates an example diagram of capturing a composite image using different sub-frames. For example, three different sub-frames may be used, comprising a first sub-frame 302 corresponding to a long exposure time T1, a second sub-frame 304 corresponding to a medium exposure time T2, and a third sub-frame 306 corresponding a short exposure time T3. In some embodiments, a camera may capture the T1, T2, and T3 sub-frames 302, 304, and 306 in sequence.

In some embodiments, as illustrated in FIG. 3, images may be captured using a rolling shutter. In a rolling shutter scheme, an image frame may be divided into a plurality of different rows. For example, in some embodiments, each row may correspond to a row of pixels in the image frame. In other embodiments, each row may correspond to a plurality of pixel rows. Image data for each row (e.g., image data for the plurality of sub-frames 302, 304, and 306) may be captured after a delay relative to the previous row, as defined by a rolling shutter angle. In some embodiments, image capture using rolling shutter may be used in order to reduce an amount of image data that that needs to be processed at a time, as a camera may not have enough buffer memory to process image data for all pixels of an image frame at the same time. By using a rolling shutter such that only a portion of the image is being processed at any particular time, these memory issues may be alleviated.

Sensor Fusion and Composite Image Timestamps

Captured camera images may be used in conjunction with data from other sensors in order to perform a variety of different applications, as map building and environmental perception, pose estimation, positioning, and/or the like. In some embodiments, a sensor fusion application may make use of temporal filtering, such as Kalman filtering (KF), extended Kalman filtering (EKF), particle filtering (PF), and/or the like, in order to construct a sensor model. For example, the sensor model may comprise a state model that may be represented as a function $\dot{x}=f(x, t)$, wherein x corresponds to state and t corresponds to time, and a measurement model that may be represented as a function $z=h(x, t)$, wherein z corresponds to a sensor measurement. Therefore, it may be important to be able to have accurate timestamps of each image or measurement from the camera and the other sensors used in the sensor fusion application.

Image timestamps may be especially important in multi-sensor fusion applications which involve heterogeneous sampling. For example, in some embodiments, a visual inertial odometry (VIO) application may fuse camera features corresponding to important discernable features of an image frame (e.g., a composite image frame, such as a WDR image frame) with features detected using an inertial measurement unit (IMU). For example, camera features may include features indicative of incoming cars, traffic signs, and/or other objects that may be captured in a composite image frame. In some embodiments, camera features and features from other sensors (e.g., an IMU) may be received at different rates. For example, camera features may be received at millisecond granularity (e.g., 30, 60, or 120 fps), while IMU features may be measured at microsecond granularity (e.g., 250 Hz, 500 Hz). As such, an error in camera feature frame timing of a few milliseconds may correspond to a large number of IMU samples. Therefore, the sensor fusion system's error performance may be heavily dependent on the ability to have accurate timestamp information for captured camera features.

As can be seen in FIG. 3, each of the sub-frames 302, 304, and 306 may be captured at different times. Because a composite image is constructed using different sub-frames captured at different times, different parts of the composite image may be exposed at different absolute time instances. For example, pixels in a first row of the composite image using image data from the T1 sub-frame 302 will have been captured at a different time as compared to pixels in the first row of the composite image using image data from the T2 sub-frame 304. In addition, because the sub-frames 302, 304, and 306 may be captured using rolling shutter, the time that particular camera features are captured will also be affected by which row(s) in the image frame the feature appears in. Consequently, different camera features within an image frame may have different timestamps, due to being captured at different times.

Centroid Timestamp

In some embodiments, a single time may be used as an approximation for all camera features within a single composite image, such as a centroid time associated with the WDR image. In some embodiments, the centroid time may correspond to a capture time associated with a particular row of the image frame (e.g., a center row). For example, as illustrated in FIG. 3, the centroid time may correspond to a capture time associated with row 310.

In some embodiments, each sub-frame (e.g., 302, 304, or 306) may be associated with a different centroid time, corresponding to a middle time between the start of capture for the sub-frame and the end of capture of the sub-frame. In some embodiments, an overall centroid time for the designated row (e.g., row 310) may be calculated as the middle time between the start of capture of a first sub-frame 302 (e.g., the T1 sub-frame) to the end of capture of a last sub-frame 306 (e.g., the T3 sub-frame), for the designated row of the image frame.

Figure 4:
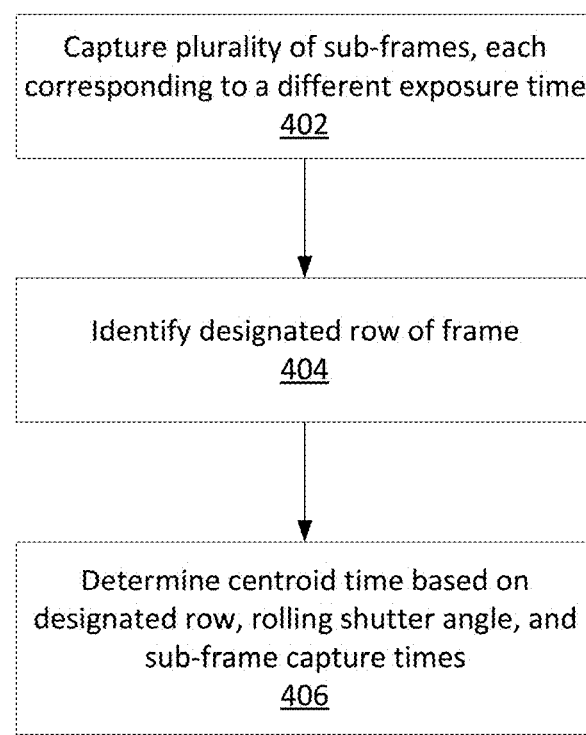
FIG. 4 illustrates a flow chart of an example process of determining a centroid time for a WDR image.

FIG. 4 illustrates a flow chart of an example process of determining a centroid time for a composite image (e.g., using a composite imaging processor, implemented by the composite IC 216 and/or processor 205). At block 402, the composite imaging processor captures a plurality of sub-frames using a camera image sensor, each sub-frame associated with a different exposure time. In some embodiments, the sub-frames may be captured using a rolling shutter (e.g., as illustrated in FIG. 3).

At block 404, the composite imaging processor identifies a designated row of the frame. In some embodiments, the designated row may correspond to a center or middle row of the image frame. At block 406, the composite imaging processor determines a centroid time for the image frame, based upon the designated row. In some embodiments, the centroid time may correspond to an overall centroid time for the designated row of the image frame, which corresponds to a middle time of the sub-frames for the designated row. In some embodiments, the centroid time may be calculated based upon one or more initial times corresponding to the sub-frame (e.g., capture times for the sub-frames for the first row of the image frame), the designated row of the image frame, and the rolling shutter angle at which the image frame was captured. For example, the exposure times for each sub-frame at the designated row may be determined based upon the initial exposure times for each sub-frame, the rolling shutter angle, and the designated row. The centroid time for the row may then be determined, based upon the sub-frame exposure times at the row.

In some embodiments, the centroid time may be used to provide a single overall time for a particular image frame. Because different parts of the composite image may be captured at different times (e.g., due to being associated with different rows and different sub-frames), the centroid time may not accurately reflect the capture times for all camera features within the composite image (e.g., camera features associated with lines of the image frame above the center line may have actual times earlier than that of the centroid time, while camera features associated with lines of the image frame below the center line may have actual time that are later than that of the centroid time). However, over a large number of captured images, it may be expected that errors corresponding to deviations between the centroid time and the actual capture time for particular features may be centered around the centroid time and may substantially cancel each other out.

Timestamp Channel

In some embodiments, it may be desired to be able to obtain and utilize more precise timing information for composite images, for use in sensor fusion and/or other applications. For example, it may be desired to be able to obtain timing data for each pixel (or group of pixels) in a composite image frame, instead of using a single timestamp to represent the entire frame. In some embodiments, timing data may be determined for each pixel in each of the captured image sub-frames 302, 304, and 306 corresponding to different exposure times (e.g., T1, T2, and T3), which may then be used in order to determine timing for each pixel of the composite image frame constructed from the captured sub-frames. It is understood that while the present application may refer primarily to timing data for pixels for ease of discussion, it is understood that in some embodiments, timing data may be determined for groups of pixels instead of for individual pixels. In some embodiments, a group of pixels may comprise a continuous array of pixels within an image frame, such as a 2×2 array of pixels comprising 4 pixels.

Figure 5:
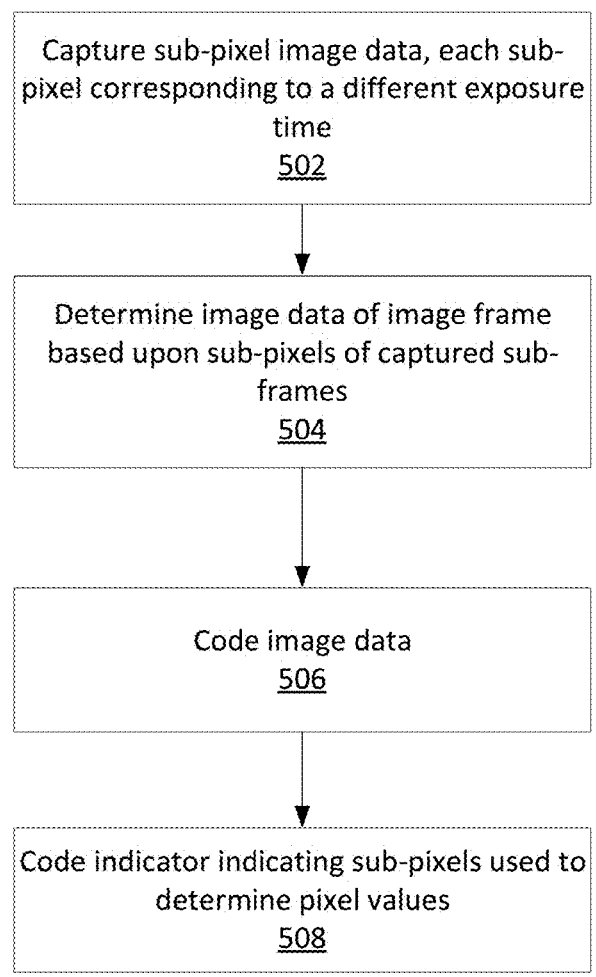
FIG. 5 illustrates a flowchart of an example process for determining and communicating timing data for a WDR image.

FIG. 5 illustrates a flowchart of an example process for determining and communicating timing data for a composite image, in accordance with some embodiments (e.g., using the composite imaging processor). At block 502, the composite imaging processor may receive sub-pixel image data (e.g., as captured using a camera image sensor), wherein each sub-pixel corresponds to a different exposure time (e.g., T1, T2, or T3). In some embodiments, the sub-pixel image data is captured by capturing an image sub-frame corresponding to each of the different exposure times (e.g., sub-frames 302, 304, and 306). In some embodiments, a rolling shutter may be used to capture the image sub-frames.

At block 504, the composite imaging processor uses the values of the sub-pixels from the captured sub-frames to determine the image data for the composite image (e.g., pixel values of the composite image). In some embodiments, the pixel values of the composite image may be based on the sub-pixel values from a portion of the captured sub-frames.

In some embodiments, the value of each pixel of the composite image frame may correspond to the value of a corresponding sub-pixel of a particular image sub-frame. For example, the value of a particular pixel of the composite image frame may be determined by selecting a corresponding sub-pixel of one of the captured image sub-frames, based upon the luminosity values of the corresponding pixel of the image sub-frames. In some embodiments, the value of the pixel may be selected based upon the corresponding sub-pixel of the captured image sub-frame having the longest exposure time where the corresponding sub-pixel value is not saturated.

In other embodiments, sub-pixel values of one or more of the captured sub-frames may be blended to determine the pixel values of the composite image. For example, the pixel value of the composite image may be determined as an intermediate of the corresponding sub-pixel values of the plurality of captured sub-frames, based upon the luminosity values of the sub-pixel values. In some embodiments, a pixel value of the composite image may be expressed as:

$$\alpha_1 P_1 + \alpha_2 P_2 \ldots + \alpha_n P_n$$

where $\alpha_n$ indicates a blending parameter for a corresponding to a sub-frame n, and $P_n$ indicates a sub-pixel of the sub-frame n corresponding to the pixel of the composite image. In some embodiments, each blending parameter $\alpha_n$ may correspond to a value between 0 and 1. In some embodiments, the sum of blending parameters $\alpha_1$ through $\alpha_n$ may be equal to a designated value (e.g., 1). In some embodiments, the value of a blending parameter for a particular sub-frame may be based upon a luminosity value of the corresponding sub-pixel of the sub-frame.

At block 506, the composite imaging processor codes the pixel values for the composite image (e.g., as determined at block 504). In some embodiments, the pixel values for each pixel of the composite image may be coded using a certain number of bits (e.g., 20 bits).

At block 508, the composite imaging processor determines and codes an indicator indicating the sub-pixels used to determine the pixel values. For example, in embodiments where the pixel values of the composite image frame each correspond to a corresponding sub-pixel of a particular sub-frame, the indicator may be coded as one or more bits indicating which sub-frame the pixel value was determined from. A length of the indicator may be based upon a number of sub-frames that are captured for constructing the composite image. For example, if there are three captured sub-frames (e.g., sub-frames 302, 304, and 306 corresponding to exposure times T1, T2, T3), the indicator may be coded using only 2 bits (e.g., 00 indicating that the pixel corresponds to the T1 sub-frame 302, 01 indicating the T2 sub-frame 304, or 10 indicating the T3 sub-frame 304).

Figure 6:
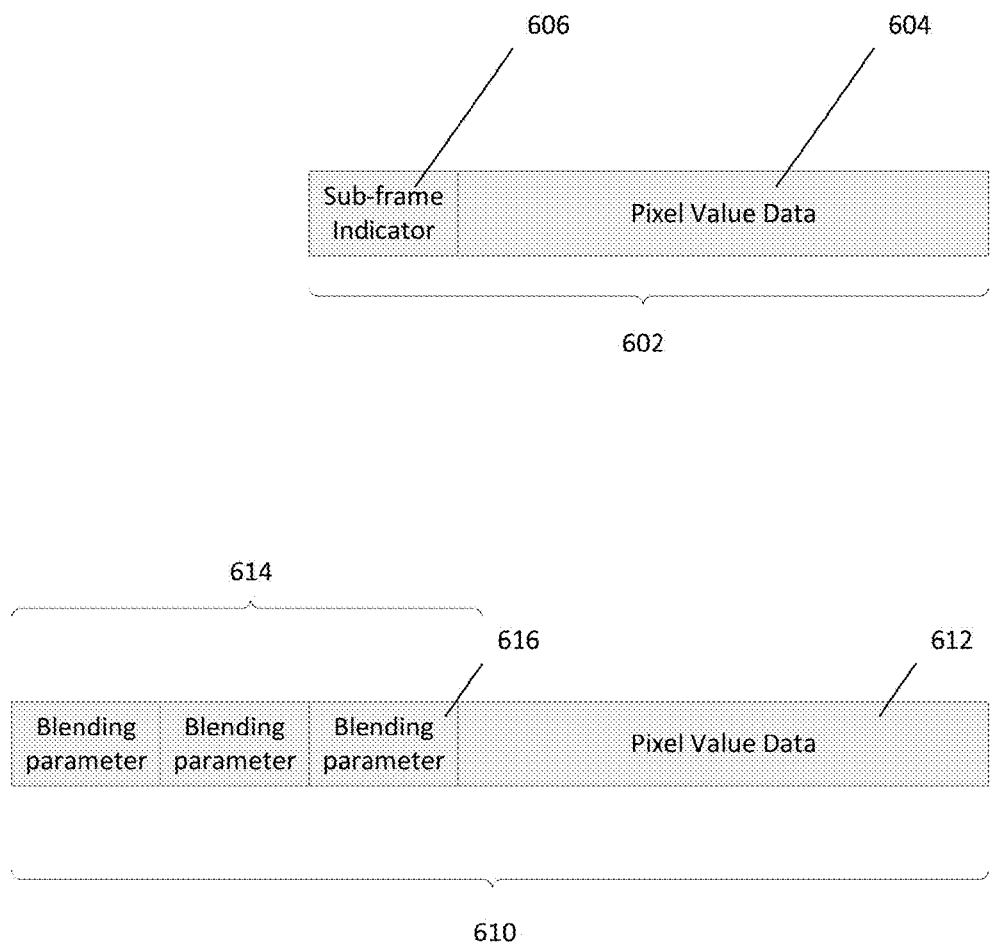
FIG. 6 illustrates example coding of pixel data for a particular pixel (or group of pixels) of a WDR image.

In some embodiments, the indicator may comprise one or more additional bits appended to the pixel value data for the pixels of the composite image. For example, FIG. 6 illustrates example coding of pixel data for a particular pixel (or group of pixels) of a composite image. The pixel data 602 may comprise pixel value data 604 indicating image information for the pixel (e.g., luminosity, chromaticity, and/or the like) as well as a sub-frame indicator 606 indicating a sub-frame corresponding to the pixel or group of pixels that the particular pixel is a part of. In some embodiments, the number of bits needed for the sub-frame indicator 606 may be small compared to the total number of bits needed to code the pixel data 602. For example, in embodiments using three sub-frames, the sub-frame indicator may have a length of 2 bits, while the pixel value data 604 may be coded using a much larger number of bits (e.g., 20 bits).

The sub-frame indicator 606 may be used to determine timing information for the pixel. For example, the capture time associated with the pixel may be considered to be the same as the corresponding sub-pixel of the sub-frame associated with the pixel. As illustrated in FIG. 3, in a rolling shutter system, the capture times for the first rows of each of the sub-frames 302, 304, and 306 may be known. For example, the first row of sub-frame 302 may be captured at a first time t, while the first row of the sub-frame 304 may be captured at a time $t+\Delta t_1$, and the first row of the sub-frame 306 may be captured at a time $t+\Delta t_2$, wherein $\Delta t_1$ may be based upon an exposure time of T1 and T2, and $\Delta t_2$ may be based upon the exposure times of T1, T2, and T3. In some embodiments, the capture time for a sub-frame at a particular row may be considered a center time that the sub-frame is exposed at the particular row.

In some embodiments, a capture time may be determined for each sub-pixel of each captured sub-frame. For example, the capture time for a sub-pixel may be determined based upon the first row capture time of the sub-frame, which row the sub-pixel is located on in the sub-frame, and the rolling shutter angle. Thus, the capture time for a pixel of the composite image may be determined by indicating which sub-frame is associated with the pixel. Once the sub-frame associated with the pixel is known, the capture time of the corresponding sub-pixel can be identified. In some embodiments, because the pixels of each row of a particular sub-frame may be captured at the same time, a capture time may be determined per row for each captured sub-frame, instead of per-pixel (or pixel group).

In embodiments where pixels of the composite image may correspond to a blending of the image values of one or more of the captured image sub-frames, the indicator may comprise one or more additional pixels indicating one or more blending parameters used to blend the sub-pixel data of the sub-frames. Pixel data 610 of FIG. 6 illustrates example pixel data for a particular pixel (or group of pixels) of a composite image where the pixel value data is based upon a blending of corresponding sub-pixels of the captured sub-frames. Pixel data 610 comprises pixel value data 612 and sub-frame indicators 614, the sub-frame indicators 614 corresponding to a plurality of blending parameters 616. Each blending parameter 616 may correspond to a particular sub-frame. For example, sub-frame indicators 614 as illustrated in FIG. 6 indicate blending parameters for three different sub-frames. In some embodiments, blending parameters for one or more sub-frames may be not indicated. For example, if there are three different sub-frames and it is known that the sum of the blending parameters for the three sub-frames must be equal to 1, the indicator may only indicate blending parameters for two of the sub-frames, the blending parameter for the third remaining sub-frame determinable once the blending parameters of the first two sub-frames are known.

Because the value of a pixel (or group of pixels) may be based upon a blending of sub-pixels of the captured sub-frames, a capture time for the pixel may not correspond to the capture times for any particular sub-pixel of the sub-frames. Instead, a proxy timing may be determined for the pixel, based upon a level of blending between sub-pixels used to construct the pixel. For example, in embodiments having three different sub-frames T1, T2, and T3 having respective capture times at a particular row of times t, $t+\Delta t_1$, and $t+\Delta t_2$, the proxy timing for a pixel in the particular row of the WDR image may be expressed as:

$$\alpha_1 t + \alpha_2(t+\Delta t_2) + \alpha_3(t+\Delta t_3)$$

where $\alpha_1$, $\alpha_2$, and $\alpha_3$ correspond to the blending parameters used for the pixel for sub-frames T1, T2, and T3, respectively. As such, the calculated capture time for the pixel of the WDR image may be an intermediate of the capture times of the image sub-frames blended to determine the pixel value. Therefore, when the blending parameters for the pixel are known, the capture time for the pixel may be determined using the capture times of the corresponding sub-pixels (or corresponding rows) of the captured sub-frames.

In some embodiments, the composite imaging processor may transmit the image data (e.g., pixel values) and/or determined indicators to be used by one or more other processors or to be stored in a memory. For example, the image data may be received by a sensor fusion processor for performing sensor fusion applications. In some embodiments, the composite imaging processor may also transmit additional information (such as sub-frame timing information, rolling shutter angle, and/or the like) with the transmitted image data. For example, the composite imaging processor may transmit timing information for the first row of each sub-frame with the image data for each frame. In some embodiments, the sub-frame timing information may be transmitted via a VSYNC signal (e.g., to another processor such as a sensor fusion processor, or a memory). That is, the composite imaging processor may transmit one or more indicators, timestamp information, both one or more indicators and timestamp information, among transmitting other aspects, etc.

Figure 7:
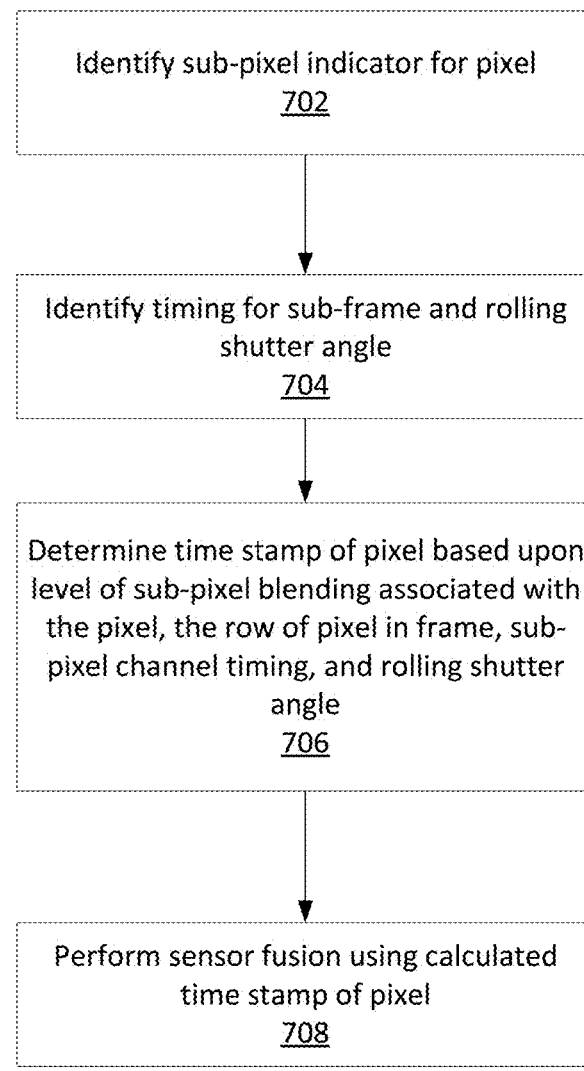
FIG. 7 illustrates a flowchart of an example process of using the coded sub-frame indicators associated with coded pixel data to determine timing information for the pixel.

FIG. 7 illustrates a flowchart of an example process of using the determined indicators associated with the image data to determine timing information for the pixel (e.g., by a sensor fusion processor). At block 702, the sensor fusion processor receives image frame data (e.g., a composite image) and identifies an indicator corresponding to a particular pixel or group of pixels of the image frame. In some embodiments, the indicator comprises one or more bits that are appended to the image data for each pixel or group of pixels of the image frame. In some embodiments, the indicator may indicate a particular sub-frame associated with the pixel. In other embodiments, the indicator may indicate one or more blending parameters corresponding to one or more sub-frames. As one non-limiting example, the sensor fusion processor can capture a plurality of sub-frames of a scene, wherein each sub-frame comprises an image of the scene captured using an exposure time that is different from at least one other exposure time of at least one other sub-frame of the plurality of sub-frames, as described in connection with FIGS. 2 and 3, for example. The sensor fusion processor can receive (e.g., from an image sensor), for each of the plurality of sub-frames, sub-pixel image data corresponding to a first portion of an image frame.

At block 704, the sensor fusion processor identifies sub-frame timing information and a rolling shutter angle. In some embodiments, the sub-frame timing information may correspond to timing information for a first row of each sub-frame. For example, the timing information for a T1 sub-frame may comprise a centroid time of a first row of the T1 sub-frame. In some embodiments, the sub-frame timing information and rolling shutter angle may have been transmitted from the composite imaging processor with the image frame data (e.g., as part of a header accompanying the image frame data). For example, the sub-frame timing information may be communicated by the composite imaging processor via a VSYNC signal to the sensor fusion processor, a memory accessible by the sensor fusion processor, and/or the like.

In some embodiments, the rolling shutter angle may be deterministic for a given camera sensor, and can thus be programmed into the logic of the sensor fusion processor or otherwise accessed by the sensor fusion processor. As non-limiting examples, the sensor fusion processor can determine composite image data corresponding to a first portion of an image frame, based on values of received sub-pixel image data for a plurality of sub-frames and/or identify an indicator based on sub-frames corresponding to received sub-pixel image data used to determine the composite image data.

At block 706, the sensor fusion processor determines timestamp information for the pixel. In some embodiments, the sub-frame timing information and rolling shutter angle can be used to determine timing information for a corresponding sub-pixel of the pixel, based upon a row of the image frame that the pixel is located in. Time stamp information for the pixel can then be determined based upon the indicator for the pixel or group of pixels. For example, in embodiments where the indicator indicates a particular sub-frame, the timestamp information for the pixel may correspond to the timing information of the corresponding sub-pixel of the indicated sub-frame. In embodiments where the indicator indicates one or more blending parameters, the timestamp information for the pixel may be calculated based upon the timing information of the corresponding sub-pixels of the sub-frames and the blending parameter values.

In some embodiments, timing information for the sub-pixels for each sub-frame may be pre-computed (e.g., stored in an array, table, or other data structure), allowing for the timestamp information for the pixel to be quickly calculated upon identification of the corresponding sub-pixel indicator. As a non-limiting example, the sensor fusion processor can determine timestamp information, based on an identified indicator, wherein the timestamp information corresponds to composite image data based upon timing information for a plurality of sub-frames.

At block 708, the sensor fusion processor performs sensor fusion using the calculated pixel timestamp by associating the pixel value of one or more corresponding readings from one or more other sensors (e.g., IMU). Because each pixel (or group of pixels) of the image frame may be associated with its own accurate timestamp, the accuracy of the sensor fusion application may be improved.

While the above flowchart refers primarily to a sensor fusion processor, it is understood that in other configurations, sub-pixel indicators associated with image pixel data can be used to determine timestamp information for pixels of an image frame by any other type of processor for performing analysis based upon timestamp information of captured image features.

Other Considerations

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described in the figures. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

A person having ordinary skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus to determine timestamp information, the apparatus comprising:
    an image sensor configured to capture a plurality of sub-frames of a scene, wherein each sub-frame comprises an image of the scene captured using an exposure time that is different from at least one other exposure time of at least one other sub-frame of the plurality of sub-frames; and
    at least one processor coupled to the image sensor and configured to:
        receive, from the image sensor, for each of the plurality of sub-frames, sub-pixel image data corresponding to a first portion of an image frame;
        determine composite image data corresponding to the first portion of the image frame based on values of the received sub-pixel image data for the plurality of sub-frames and by selecting, from the plurality of sub-frames a particular sub-frame to be associated with the composite image data based on luminosity values of the sub-pixel image data of the plurality of sub-frames;
        identify an indicator based on the sub-frames corresponding to the received sub-pixel image data used to determine the composite image data; and
        determine timestamp information, based on the identified indicator, wherein the timestamp information corresponds to the composite image data based upon timing information for the plurality of sub-frames.

2. The apparatus of claim 1, wherein the plurality of sub-frames are captured using a rolling shutter.

3. The apparatus of claim 1, wherein the composite image data corresponds to high dynamic range (HDR) image data or wide dynamic range (WDR) image data.

4. The apparatus of claim 1, wherein indicator indicates the particular sub-frame associated with the composite image data.

5. The apparatus of claim 1, wherein to determine the timestamp information based on the identified indicator, the processor is configured to:
    identify the timing information for the plurality of sub-frames, wherein the timing information comprises at least initial timing information associated with the plurality of sub-frames, and a rolling shutter angle associated with the image sensor;
    determine sub-pixel timing information for each of the plurality of sub-frames, based upon the initial timing information associated with the plurality of sub-frames, a location of the first portion of the image frame, and the rolling shutter angle associated with the image sensor; and
    determine a timestamp associated with the composite image data, based upon the determined sub-pixel timing information and the indicator associated with the composite image data.

6. The apparatus of claim 5, wherein the sub-pixel timing information for each of the plurality of sub-frames is pre-computed and stored in a data structure.

7. The apparatus of claim 5, wherein the location of the first portion of the image frame comprises a row of the image frame.

8. An apparatus to determine timestamp information, the apparatus comprising:
    an image sensor configured to capture a plurality of sub-frames of a scene, wherein each sub-frame comprises an image of the scene captured using an exposure time that is different from at least one other exposure time of at least one other sub-frame of the plurality of sub-frames; and
    at least one processor coupled to the image sensor and configure to:

receive, from the image sensor, for each of the plurality of sub-frames, sub-pixel image data corresponding to a first portion of an image frame;

determine composite image data corresponding to the first portion of the image frame based on values of the received sub-pixel image data for the plurality of sub-frames;

identify an indicator based on the sub-frames corresponding to the received sub-pixel image data used to determine the composite image data; and determine timestamp information, based on the identified indicator, wherein the timestamp information corresponds to the composite image data based upon timing information for the plurality of sub-frames, wherein determining the composite image data comprises blending values of the sub-pixel image data of one or more sub-frames of the plurality of sub-frames using one or more blending parameters, each blending parameter corresponding to a sub-frame of the plurality of sub-frames, and indicating a degree to which the sub-pixel image data corresponding to the sub-frame is used to determine the composite image data, and wherein the indicator indicates at least a portion of the one or more blending parameters.

9. The apparatus of claim 8, wherein a sum of the one or more blending parameters is equal to 1.

10. A method for determining timestamp information for wide dynamic range composite images, comprising:

receiving, from an image sensor, sub-pixel image data corresponding to a first portion of an image frame for each of a plurality of sub-frames, each sub-frame comprising an image of a scene captured using an exposure time that is different from at least one other exposure time of at least one other sub-frame of the plurality of sub-frames;

determining composite image data corresponding to the first portion of the image frame based on values of the received sub-pixel image data for the plurality of sub-frames and by selecting, from the plurality of sub-frames, a particular sub-frame to be associated with the composite image data based on luminosity values of the sub-pixel image data of the plurality of sub-frames;

identifying an indicator based on the sub-frames corresponding to the received sub-pixel image data used to determine the composite image data; and determining timestamp information, based on the identified indicator, wherein the timestamp information corresponds to the composite image data based upon timing information for the plurality of sub-frames.

11. The method of claim 10, wherein the sub-pixel image data received from the image sensor is captured using a rolling shutter.

12. The method of claim 10, wherein the composite image data corresponds to high dynamic range (HDR) image data or wide dynamic range (WDR) image data.

13. The method of claim 10, wherein the composite image data corresponds to wide dynamic range (WDR) image data, and wherein the indicator indicates the particular sub-frame associated with the WDR image data.

14. The method of claim 10, wherein determining composite image data comprises blending sub-pixel image data of one or more sub-frames of the plurality of sub-frames using one or more blending parameters, each blending parameter corresponding to a sub-frame of the plurality of sub-frames, wherein the composite image data corresponds to wide dynamic range (WDR) image data, and indicating a degree to which the sub-pixel image data corresponding to the sub-frame is used to determine the WDR image data, and wherein the indicator indicates at least a portion of the one or more blending parameters.

15. The method of claim 14, wherein a sum of the one or more blending parameters is equal to 1.

16. A method for determining timestamp information for wide dynamic range composite images, comprising:

receiving, from an image sensor, sub-pixel image data corresponding to a first portion of an image frame for each of a plurality of sub-frames, each sub-frame comprising an image of a scene captured using an exposure time that is different from at least one other exposure time of at least one other sub-frame of the plurality of sub-frames;

determining composite image data corresponding to the first portion of the image frame based on values of the received sub-pixel image data for the plurality of sub-frame;

identifying an indicator based on the sub-frames corresponding to the received sub-pixel image data used to determine the composite image data; and determining timestamp information based on the identified indicator by:

identifying timing information associated with the plurality of sub-frames, wherein the timing information comprises initial timing information associated with the plurality of sub-frames and a rolling shutter angle associated with the image sensor;

determining sub-pixel timing information for each of the plurality of sub-frames, based upon the initial timing information associated with the plurality of sub-frames, a location of the first portion of the image frame, and the rolling shutter angle associated with the image sensor; and determining a timestamp associated with an image value, based upon sub-pixel timing information and the indicator associated with the image value, wherein the timestamp information corresponds to the composite image data based upon timing information for the plurality of sub-frames.

17. The method of claim 16, wherein the sub-pixel timing information for each of the plurality of sub-frames is precomputed and stored in a data structure.

18. The method of claim 16, wherein the location of the first portion of the image frame comprises a row of the image frame.

* * * * *